(12) United States Patent
Quinlan

(10) Patent No.: US 9,052,966 B1
(45) Date of Patent: Jun. 9, 2015

(54) MIGRATING CODE FROM A SOURCE FORMAT TO A TARGET FORMAT

(75) Inventor: Brian Keith Quinlan, Pyrmont (AU)

(73) Assignee: GOOGLE INC., Mountain View, CA (US)

( * ) Notice: Subject to any disclaimer, the term of this patent is extended or adjusted under 35 U.S.C. 154(b) by 38 days.

(21) Appl. No.: 13/310,458

(22) Filed: Dec. 2, 2011

(51) Int. Cl.
*G06F 9/45* (2006.01)

(52) U.S. Cl.
CPC ........................................ *G06F 8/51* (2013.01)

(58) Field of Classification Search
CPC ............... G06F 8/20; G06F 8/30; G06F 8/36; G06F 8/41; G06F 8/51; G06F 8/52; G06F 8/71; G06F 8/427; G06F 9/44505; G06F 9/45516; G06F 9/541; G06Q 10/10
USPC .................................................. 717/120, 137
See application file for complete search history.

(56) References Cited

U.S. PATENT DOCUMENTS

| | | | | |
|---|---|---|---|---|
| 6,769,115 | B1 * | 7/2004 | Oldman ........................ | 717/126 |
| 8,726,229 | B2 * | 5/2014 | Brunswig et al. .............. | 717/108 |
| 2001/0056504 | A1 * | 12/2001 | Kuznetsov .................... | 709/310 |
| 2004/0015888 | A1 * | 1/2004 | Fujii et al. ..................... | 717/136 |
| 2005/0273772 | A1 * | 12/2005 | Matsakis et al. .............. | 717/136 |
| 2009/0024986 | A1 * | 1/2009 | Meijer et al. .................. | 717/137 |
| 2013/0124604 | A1 * | 5/2013 | LeMaster ...................... | 709/203 |

OTHER PUBLICATIONS

Gatlin, K.S., "Profile-Guided Optimization with Microsoft Visual C++ 2005," Visual Studio .Net 2003, Microsoft, Mar. 2004, 11 Pages.
Jet Brains, "ReSharper Reviewer's Guide," date unknown, 28 pages.
Phython Software Foundation, "25.4. 2to3—Automated Python 2 to 3 code translation," Last updated Jul. 5, 2012, 7 pages [online][retrieved on Jul. 5, 2012] Retrieved from the internet <URL:http://docs.python.org/library/2to3.html>.
Popescu, V., "Java Application Profiling using TPTP," International Business Machines Corp., Feb. 21, 2006, 12 Pages.
Rothlisberger, D., et al., "Exploiting Runtime Information in the IDE*," International Conference on Program Comprehension, 2008, pp. 1-10.

* cited by examiner

*Primary Examiner* — Qing Chen
*Assistant Examiner* — Andrew M Lyons
(74) *Attorney, Agent, or Firm* — Birch, Stewart, Kolasch & Birch, LLP

(57) ABSTRACT

Source code is automatically migrated from a source format to a target format. In particular, the execution of the source code is dynamically analyzed for incompatibilities using runtime information. Solutions for the incompatibilities are additionally determined. Based on the identified incompatibilities and solutions, the source code is converted from the source format to the target format.

17 Claims, 5 Drawing Sheets

MIGRATING CODE FROM A SOURCE FORMAT TO A TARGET FORMAT

BACKGROUND

1. Field of Disclosure

This invention relates generally to computer programming, and particularly to migrating source code from one format to another.

2. Description of the Related Art

In computer programming, the migration of source code from one format to another is a common occurrence. For example, a given programming language may be updated from an initial version to a later version. The later version may include different operations, object data types, etc. As a result, to make source code written in the initial version compatible with the later version, modification of the source code may be required.

One technique for migrating source code involves using static analysis i.e., migrating the source code without executing the code. While such a technique normally is able to handle syntactic differences (i.e., differences in code formatting), it is not able to effectively handle semantic differences (i.e., differences in code behavior). More specifically, because information critical to code behavior (e.g., object data type information) is frequently not determined until source code execution or runtime, the technique is often unable to properly migrate code. As a result, code migrated using the technique must often be manually corrected, which can cause the code migration process to be tedious and time consuming for developers.

SUMMARY

The above and other issues are addressed by a method, a non-transitory computer-readable storage medium, and a system for migrating source code.

Embodiments of the method include executing source code in an environment compatible with a source format. During execution of the source code, an analysis is performed on runtime information associated with the execution of the source code in the environment compatible with the source format. Responsive to the analyzed runtime information, an incompatibility in the source code with respect to a target format is identified. A solution is then determined for the incompatibility by performing a lookup in a data structure containing one or more solutions. The solution enables the source code to be made compatible with the target format. The source code is thereafter converted from the source format to the target format based at least in part on the solution.

Embodiments of the computer-readable storage medium store computer-executable instructions for performing the steps described above. Embodiments of the system further include a processor for executing the computer-executable instructions.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
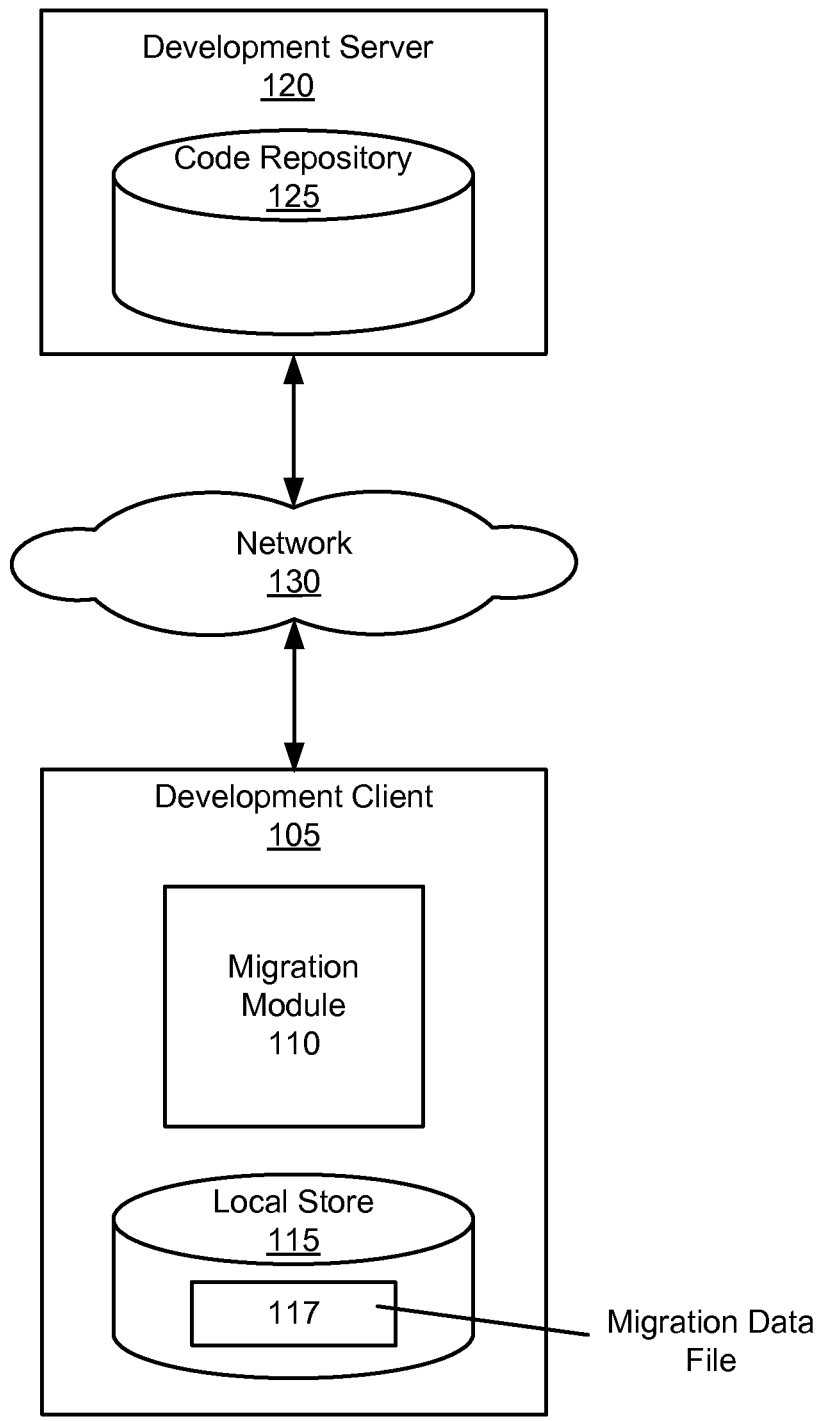
FIG. 1 is a high-level diagram illustrating a typical environment for developing source code according to one embodiment.

FIG. 1 is a high-level block diagram illustrating a typical environment 100 used for the development of source code according to one embodiment. In one embodiment, the environment 100 can be used to automatically migrate source code from a first format to a second format. As used herein, the format of source code prior to code migration is referred to as the source format. The format of source code following code migration is referred to as the target format. Referring again to FIG. 1, the environment 100 includes a development client 105 in communication with a development server 120 via a network 130. Only one development client 105 and one development server 120 are shown in FIG. 1 for purposes of clarity, but those of skill in the art will recognize that typical environments can have hundreds or thousands of development clients 105, and can also have multiple development servers 120.

The network 130 enables communications between the development client 105 and the development server 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The development server 120 stores source code to be migrated from a source format to a target format. In one embodiment, the development server 120 includes a code repository 125 that stores data such as source code, compiled code, software libraries, and/or the like. The development server 120 communicates with the development client 105 by exchanging data via the network 130. In particular, the development server 120 can receive requests, via the network 130, from the development client 105 to retrieve data from the code repository 125. For example, the development client 105 can request an item of source code be retrieved from the code repository 125. As used herein, an item of source code can be the source code comprising a data file or a number of data files, a subset of the source code comprising a data file or a number of data files, etc. The development server 120 can additionally receive data, via the network 130, from the development client 105 and store the data in the code repository 125. For example, the development server 120 can receive an item of source code generated by the development client 105 and store the source code in the code repository 125.

The development client 105 is an electronic device used by a developer to migrate source code from a source format to a target format. In one embodiment, the development client 105 is a conventional computer system executing, for example, a MICROSOFT WINDOWS compatible operating system (OS), APPLE OS X, UNIX, and/or a LINUX distribution. The development client 105 can be any type of computer system, such as a laptop, desktop, workstation, or server. The development client 105 can also be another device having computer functionality, such as a personal digital assistant (PDA), mobile telephone, tablet device, etc.

As shown, the development client 105 includes a migration module 110 and a local store 115. The local store 115 generally stores data used by the migration module 110. For example, the data stored on local store 115 can include an item of source code received by the development client 105 from the development server 120. The local store 115 can additionally store source code and/or other data generated by the migration module 110. For example, the local store 115 can store a migration data file 117. The migration data file 117 can include information usable for migrating source code. In one embodiment, the migration data file 117 can include a table of entries or records. Each entry can include an identified incompatibility for an item of source code, the location of where the incompatibility occurs in the item of source code, and a corresponding solution to the incompatibility. For example, an entry in the migration data file 117 can include a line of incompatible code, a specific line number in the source code where the incompatible code is located, and a corresponding line of compatible code (i.e., a solution).

The migration module 110 migrates an item of source code from the source format to the target format. A format can include or be a programming language, a version of a programming language, an application programming interface (API), a version of an API, etc. For example, the migration module 110 can migrate an item of source code compatible with version 2.0 of the PYTHON programming language into an item of source code compatible with version 3.0 of the same language.

In one aspect, the migration module 110 performs a dynamic analysis of an execution of the source code item in an environment compatible with the source format. As part of this execution, the migration module 110 uses information that would not otherwise be available during a static analysis of the code in order to identify portions of the code in the source format that are incompatible with the target format. Based on this analysis, the migration module 110 converts the item of source code to the target format. As a result, the migration module 110 can more accurately migrate source code from the source format to the target format than would be possible using only a static analysis of the code.

For example, assume that a developer has developed an item of source code in version 2.0 of the PYTHON programming language. Illustratively, the item of source code can be as follows:

1 def foo(d):
2 return d.items( )[1:]

In this sample item of source code, line 1 defines a function foo that accepts an argument "d". Assume that the argument "d" is intended to be an object having a dictionary data type. It should be appreciated, however, that because the PYTHON programming language is dynamic, the data type for "d" is not resolved until runtime. Line 2 includes code for selecting the items of the argument "d" (via the d.items( ) call). Such a selection, when performed on a dictionary object, results in the creation of a list object. Line 2 additionally includes code for slicing the list object (via the slicing shorthand [1:]). Line 2 further includes code for returning the resulting sliced list object (via the return call).

Assume, at a later time, that the developer wishes to migrate the sample source code from version 2.0 to version 3.0 of the PYTHON programming language. Under version 3.0 of the language, selecting the items of a dictionary object no longer returns an object that supports slicing. More specifically, selecting the items of the argument "d" using the d.items( ) call no longer results in an object of a list data type. As such, performing the slice function in the sample code above would cause an error.

In migrating the sample source code to version 3.0 of the PYTHON programming language, a static analysis of the source code would be unable to identify and correct the issue highlighted above. In particular, because the dictionary data type of the argument "d" is not resolved until runtime, the static analysis technique would not have the information necessary to determine that the source code performs a slicing operation on an unsupported data type. As such, the source code would not be modified to accordingly address the issue. In contrast, the development client 105, through first executing and analyzing an item of source code, enables the item of source code to be properly migrated, as will be described in greater detail below.

In one embodiment, the environment 100 is not a networked environment. More specifically, the environment 100 may not include the development server 120 and/or the network 130. In such an embodiment, the development client 105 may locally migrate source code from a source format to a target format without interacting with a development server. For example, an item of source code can be retrieved locally from the local store 115 by the development client 105 and migrated to a target format. The migrated source code can thereafter be stored locally on the local store 115.

Figure 2:
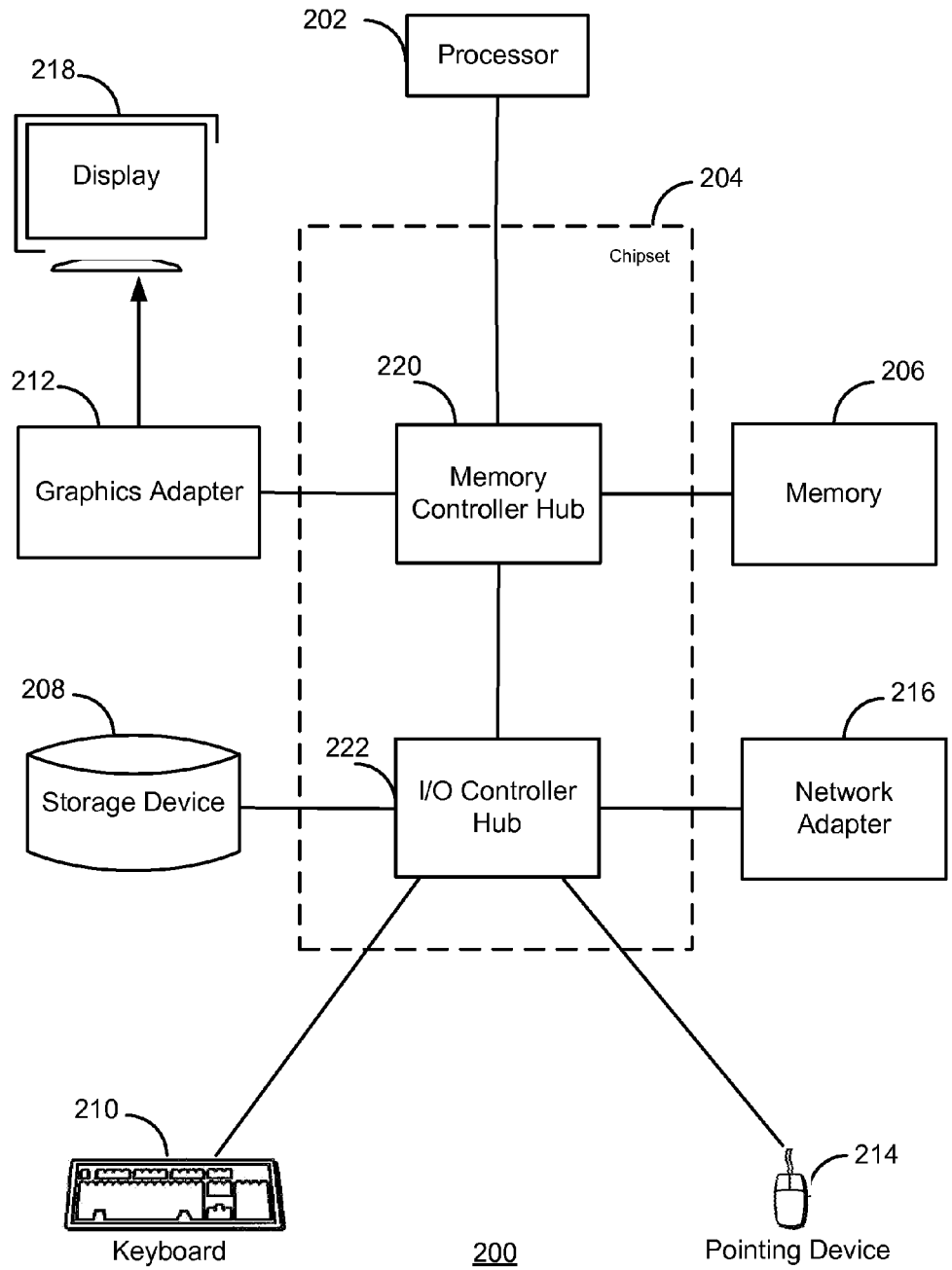
FIG. 2 is a high-level block diagram of a computer system for the development of source code according to one embodiment.

FIG. 2 is a high-level block diagram of a computer 200 for use as the development client 105 and/or the development server 120 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 130.

As is known in the art, a computer 200 can have different and/or other components than those shown in FIG. 2. In addition, the computer 200 can lack certain illustrated components. In one embodiment, a computer 200 acting as the development server 120 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
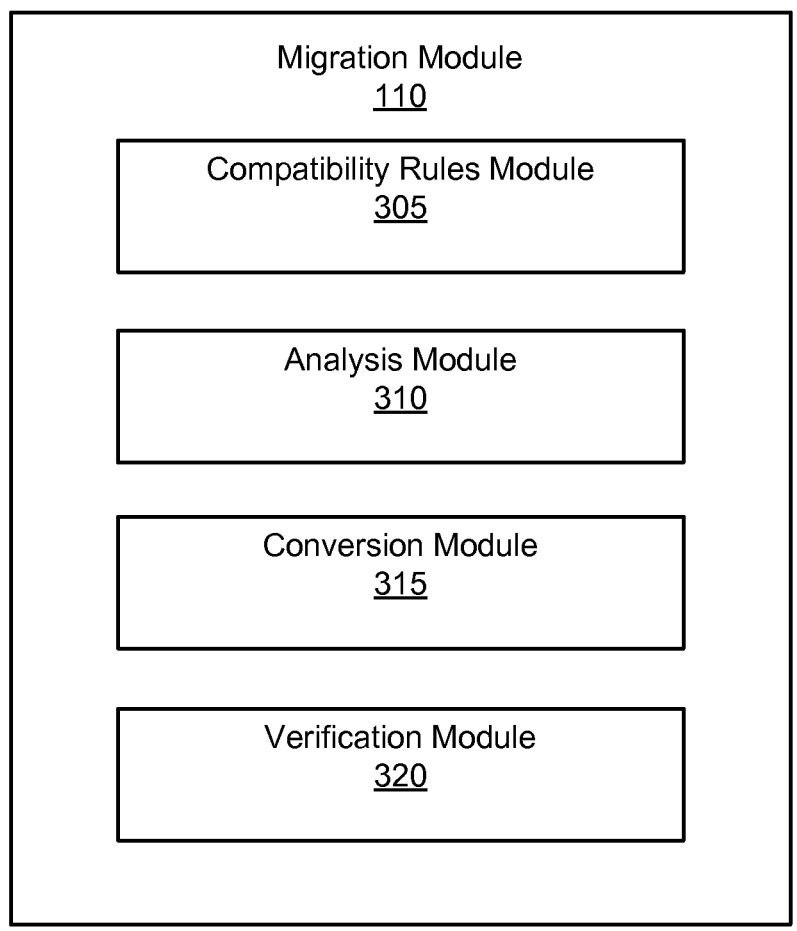
FIG. 3 is a high-level block diagram illustrating a detailed view of modules within a migration module according to one embodiment.

FIG. 3 is a high-level block diagram illustrating a detailed view of modules within the migration module 110 according to one embodiment. Some embodiments of the migration module 110 have different and/or other modules than the ones described herein. Similarly, the functions can be distributed among the modules in accordance with other embodiments in a different manner than is described here. Likewise, the functions can be performed by other entities.

The migration module 110 includes modules for performing various functions. These modules include a compatibility rules module 305, an analysis module 310, a conversion module 315, and a verification module 320. The modules 305, 310, 315, and 320 include functionality corresponding to the functionality invoked on the development client 105 when migrating code, such as the sample source code described above.

At the highest level, the compatibility rules module 305 stores rules usable for migrating source code from a source format to a target format. In one embodiment, the compatibility rules module 305 may support the migration of source code from a variety of different source formats to a variety of different target formats. For example, the compatibility rules module 305 can include rules that enable an item of source code to be converted from PYTHON version 2.0 to PYTHON version 3.0, from PHYTHON version 3.0 to PYTHON version 2.0, from PHP to PYTHON version 3.0, etc.

The rules stored in the compatibility rules module 305 can be created in any suitable manner. In one embodiment, the rules are created by encoding expert knowledge supplied by a human user. The expert knowledge can be supplied by the human user via an input device (e.g., a keyboard and/or mouse) attached to the development client 105. The expert knowledge can alternatively be supplied by the human user at a computing device different from the development client 105. After creating the rules through encoding the expert knowledge, the other computing device can send the rules to the development client 105 via the network 130.

In one embodiment, the compatibility rules module 305 includes rules usable for identifying incompatibilities (e.g., semantic incompatibilities) in an item of source code, where the item of source code is to be migrated from a source format to a target format. For instance, the compatibility rules module 305 can include a table of rules specifying the objects, functions, methods, operations, and/or the like that are incompatible between two different formats. For example, the compatibility rules module 305 can include a rule indicating that under PYTHON version 3.0, a slicing operation cannot be performed on the result of an item selection of a dictionary object (i.e., the d.items( ) call in the sample code above).

The compatibility rules module 305 additionally includes data usable for determining a solution to an identified incompatibility. For instance, the data can include information regarding the manner in which an incompatible usage of a data object can be converted into a compatible usage. Illustratively, the compatibility rules module 305 can include information indicating how an object can be converted, under version 3.0 of the PYTHON programming language, to support a slicing operation.

The analysis module 310 analyzes the execution of an item of source code to dynamically identify incompatibilities and corresponding solutions. In one aspect, the identified incompatibilities may be incompatibilities relating to the semantics or syntax of the source code with respect to the target format. In one embodiment, the analysis module 310 executes an item of source code in an environment compatible with the source format. For example, an item of source code may be written in version 2.0 of the PYTHON programming language. As a result, the analysis module 310 executes the item of source code in an environment compatible with version 2.0 of the language. In one embodiment, the analysis module 310 may include an interpreter that executes the source code in the environment compatible with the source format.

Execution of the source code can be facilitated by applying one or more unit tests to individual units of the source code. As used herein, a unit of source code can refer to a testable part of the source code. For example, a unit may be an individual function, procedure, or interface of the source code. During each unit test, various inputs designed to ensure that the source code executes correctly for an environment compatible with the source format under a variety of different conditions can be provided. For instance, a unit test can make a number of calls to functions within the source code and pass a variety of different arguments to the functions. The unit test can additionally verify that any returned results are correct. For example, referring to the sample code above, a unit test may call the function foo and pass a dictionary object as the argument "d". The unit test may further verify that a list object is returned by the foo function. In practice, unit tests are often created during the initial development of an item of source code. As such, many source code items already have associated unit tests. These same unit tests can be reused by the analysis module 310 to aid in the migration of the source code items.

In one embodiment, the source code may not include a semantic or syntactic incompatibility with respect to the source format. More specifically, the source code may be written such that the code's structure and behavior is compatible with the source format. As a result, when tested using unit tests in an environment for the source format, an incompatibility with respect to the source format is not identified. In such an embodiment, the source code may be executed successfully. It should be appreciated, however, that the source code may still include logic errors or other similar bugs unrelated to the semantics or syntax of the code.

In one embodiment, while a unit test is being performed, the analysis module 310 analyzes runtime information associated with the execution of the item of source code. Responsive to the analyzed runtime information, the analysis module 310 identifies incompatibilities in the source code with respect to a target format. More specifically, the analysis module 310 can include instrumentation usable to monitor the behavior of the source code during a unit test. As the source code is executed during a unit test, the analysis module 310 uses the instrumentation to track runtime information for the source code, such as object data types, variable values, runtime metadata, etc. The analysis module 310 additionally uses the instrumentation to monitor for certain types of code behavior. For instance, the analysis module 310 can use the instrumentation to identify when an object is returned and/or a function, method, or operation is called. Each time the analysis module 310 identifies such code behavior, the module 310 performs a check to determine whether the behavior is compatible with the target format. In particular, the analysis module 310 can reference the rules provided by the compatibility rules module 305 and the tracked runtime information to determine the compatibility of the behavior with the target format. For example, a line in an item of source code may include a function that is called on a particular object. While the line is being executed, the analysis module 310 performs a check and identifies the data type of the object. The analysis module 310 can then reference the rules provided by the compatibility rules module 305 to determine whether the function called on the object is valid for the identified data type for the target format.

In the embodiment, the identification of incompatibilities in the source code with respect to the target format is performed concurrently with the identification of incompatibilities for the source code in the source format. In one embodiment, an incompatibility for the target format may be determined to exist if, for a given statement of code, an incompatibility (e.g., a semantic incompatibility) is identified for the target format, but not for the source format.

In one embodiment, the analysis module 310, responsive to identification of an incompatibility for the target format, references the data included in the compatibility rules module 305 to determine a corresponding solution. In one embodiment, the analysis module 310 can perform a lookup in a data structure (e.g., a table, etc.) of the compatibility rules module 305 for the corresponding solution. The solution can enable the item of source code to be made compatible with the target format. The solution can be an exact solution for the incompatibility (e.g., a specific line or lines of converted code) or a general solution (e.g., a general instruction indicating how to correct the incompatibility).

The analysis module 310 further records any identified incompatibility, the location of the incompatibility, and the determined solution for the incompatibility to the migration data file 117. Following execution of the source code, the analysis module 310 stores the migration data file 117 in the local store 115 and/or sends the file to the development server 120 for storage in the code repository 125. The migration data file 117 can be later accessed by the conversion module 315.

As an example, the analysis module 310 can perform unit testing on the sample source code described above using PYTHON version 2.0. As the sample source code is being executed, the analysis module 310 performs checks for incompatibilities based on the rules provided by the compatibility rules module 305. The rules can be those specific to migrating code from PYTHON version 2.0 to PYTHON version 3.0. At line 2 of the sample source code, the analysis module 310 determines that "d" is a dictionary object. Based on this determination, the analysis module 310 determines that the d.items( ) call in the code results in a non-list object under version 3.0 of the PYTHON programming language while the slicing function (i.e., [1:]) called on the non-list object in fact requires a list object. Upon making such a determination, the analysis module 310 records the incompatibility to a table in the migration data file 117. The analysis module 310 additionally determines and records a solution to the incompatibility in the migration data file 117. The resulting table entry can appear as the following:

| Location | Incompatibility | Solution |
|---|---|---|
| Line 2 | d. items ( ) [1:] | list (d. items ( ) ) [1:] |

The conversion module 315 converts an item of source code from a source format to a target format based at least in part on the solution determined by the analysis module 310. More specifically, the conversion module 315 converts the item of source code using the migration data file 117 generated by the analysis module 310. The migration data file 117 can be retrieved from the local store 115 and/or the development server 105. In one aspect, the conversion module 315 performs, for each line in the item of source code, a lookup in the migration data file 117 for one or more entries that reference the line. For each located entry, the conversion module 315 identifies the incompatibility indicated by the entry and its corresponding solution. For example, upon reaching line 2 of the sample source code described above, the conversion module 315 performs a lookup in the migration data file 117 and locates an entry identifying that the d.items( ) [1:] call of line 2 is not compatible with version 3.0 of the PYTHON programming language. As a result, the conversion module 315 identifies the solution for the incompatibility and modifies the source code accordingly. In particular, the conversion module 315 replaces d.items( ) [1:] in the code with list (d.items( )) [1:]. In doing so, the object resulting from the d.items( ) call is converted to a list object, which enables the object to be sliced.

In one implementation, the migration data file 117 includes the exact solution for an incompatibility. As such, the conversion module 315 replaces incompatible code with the compatible code embodying the solution. In another implementation, the migration data file 117 includes a general solution. The general solution can indicate the manner in which the conversion module 315 can convert incompatible code to compatible code embodying the solution. For example, the migration data file 117 may include a solution indicating that the object resulting from a d.items( ) call must be converted to a list. Based on such an indication, the conversion module 315 determines the specific code needed to convert the object to have a list data type.

In one embodiment, the conversion module 315 can identify and resolve certain incompatibilities without referencing the migration data file 117. In particular, the conversion module 315 can include rules for identifying and resolving those incompatibilities that may be identified statically. For instance, the conversion module 315 can resolve incompatibilities relating to code structure. As an example, the conversion module 315 may convert the syntax of an item of source code to PYTHON version 3.0 without referencing the migration data file 117.

In one aspect, the conversion module 315 can record errors encountered during the conversion. For example, a solution for an incompatibility might not be included in the migration data file 117. As a result, the conversion module 315 may be unable to properly convert the incompatibility to code compatible with the target format. Responsive to such a situation, the conversion module 315 can record the error. In one embodiment, the recorded error can indicate the specific conversion problem, and optionally, the line where the problem occurred. In one aspect, recorded errors can be stored in the local store 115 and/or sent to the development server 120 for storage in the code repository 125.

After performing the conversion process, the conversion module 315 outputs a migrated item of source code. In one aspect, the migrated item of source code can be stored in the local store 115 and/or sent to the development server 120 for storage in the code repository 125. The migrated item of source code can be later accessed by the verification module 320. In one embodiment, the errors encountered during the conversion can be reported to the user in a listing of errors following the conversion process. In other embodiments, the errors encountered during the conversion can be reported following verification, as will be described below.

In one embodiment, the verification module 320 verifies a migrated item of source code. In particular, the verification module 320 can execute the migrated item of source code in an environment compatible with the target format. For example, an item of source code may have been migrated to version 3.0 of the PYTHON programming language. As such, the verification module 320 executes the migrated item of source code in an environment compatible with version 3.0 of the PYTHON programming language. In one embodiment, the verification module 320 may include an interpreter that executes the source code in the environment compatible with the target format. The migrated source code can be retrieved from the local store 115 and/or the development server 105. In one aspect, the verification module 320 performs unit testing on the migrated item of source code. The unit tests can enable the verification module 320 to determine that the migrated code performs the correct behaviors (e.g., returns the correct values, performs the correct operations, etc.). In one embodiment, the verification module 320 generates and presents a report to a user that provides information regarding the migration. For example, the report can indicate the modifications made to the item of source code during the migration process. In one embodiment, he report additionally includes a listing of the errors recorded during the conversion process. The errors included in the list can be retrieved from the local store 115 and/or the development server 105.

Figure 4:
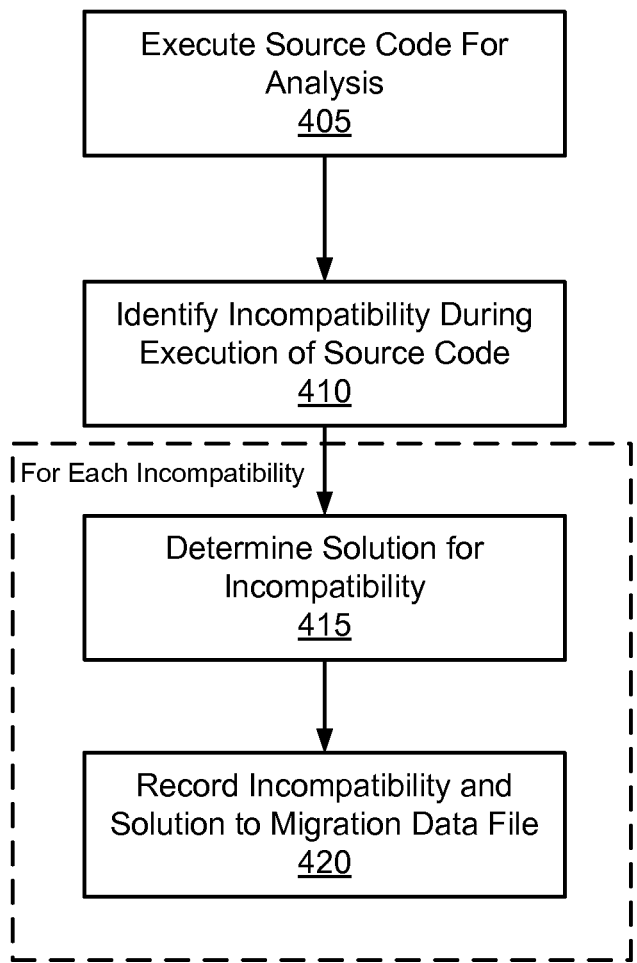
FIG. 4 is a flow chart illustrating a method of executing and analyzing source code in order to migrate the source code according to one embodiment.

FIG. 4 is a flowchart illustrating a method of executing and analyzing source code in order to enable code migration according to one embodiment. Other embodiments can perform the steps of the method in different orders and can include different, additional and/or fewer steps. The method shown in FIG. 4 can be performed by the migration module 110. In particular, the migration module 110 executes 405 an item of source code to be migrated from a source format to a target format. The item of source code is executed in an environment compatible with the source format. As the source code is executed, the migration module 110 identifies 410 incompatibilities in the source code with respect to the target format. Identification of the incompatibilities can be based on the information collected from executing the source code and on the compatibility rules stored in the migration module 110. For each identified incompatibility, the migration module 110 determines 415 a solution for the incompatibility. The migration module 110 records 420 the incompatibility, the location of the incompatibility, and the solution to the migration data file 117.

Figure 5:
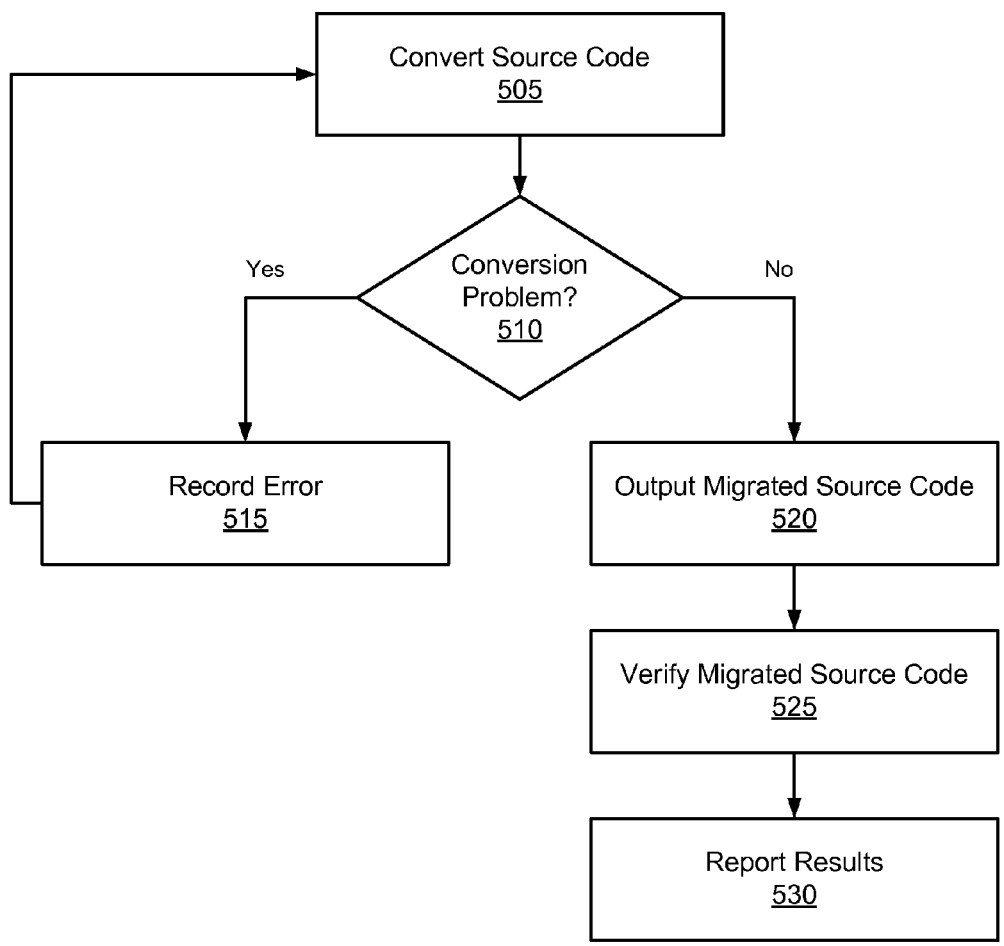
FIG. 5 is a flow chart illustrating a method of converting source code according to one embodiment.

FIG. 5 is a flowchart illustrating a method of converting source code according to one embodiment. Other embodiments can perform the steps of the method in different orders and can include different, additional and/or fewer steps. The method shown in FIG. 5 can be performed by the migration module 110. In particular, the migration module 110 converts 505 an item of source code from a source format to a target format. The conversion can be based on the previously generated migration data file 117. In particular, the migration module 110 can identify the incompatibilities referenced in the migration data file 117 and apply a corresponding solution for each incompatibility. The migration module 110 can additionally identify incompatibilities not referenced in the migration data file 117 (e.g., syntax problems), and apply a corresponding solution for each incompatibility. The migration module 110 determines 510 whether a problem has occurred while converting the source code. In the event a problem has occurred, the migration module 110 records 515 an error. The error can include information regarding the specific problem encountered during conversion of the source code as well as the location of the problem in the source code. After recording the error, the migration module 110 continues converting the source code. Upon completing conversion of the source code, the migration module 110 outputs 520 the migrated source code. In one embodiment, the migration module 110 can additionally present a listing of the errors that were encountered during the conversion to the user via, for example, the graphical user interface of the development client 105. In an embodiment, the migration module 110 verifies 525 the migrated source code. In particular, the migration module 110 can use unit tests to determine whether the source code has been properly converted. Following verification, the migration module 110 reports 530 the results of the verification to the user via, for example, the graphical user interface of the development client 105. If the listing of errors were not previously presented to the user, the results can additionally include the listing of errors.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of migrating dynamic language source code from a source format to a target format comprising:

executing the dynamic language source code in an environment compatible with the source format;

analyzing, during execution of the dynamic language source code, runtime information associated with the execution of the dynamic language source code in the environment compatible with the source format;

determining a data type for an object in the dynamic language source code for the target format based on the analyzed runtime information;

automatically identifying, responsive to the analyzed runtime information and the determined data type, a runtime incompatibility in the dynamic language source code with respect to the target format involving the determined data type for the object being used in a manner that is incompatible with the data type in the target format, the automatically identifying being accomplished by
  accessing encoded expert knowledge describing how to convert dynamic language source code from a source format to a target format; and
  determining that a run-time incompatibility with respect to the target format exists in the dynamic language source code based on the accessed encoded expert knowledge;
automatically performing a lookup, in a data structure, for a solution to the identified runtime incompatibility, the solution enabling the dynamic language source code to be made compatible with the target format by indicating a conversion technique for converting the object to a data type that is compatible with respect to the target format;
recording any identified runtime incompatibility, a location of the identified runtime incompatibility in the dynamic language source code, and the determined solution to the identified runtime incompatibility in a migration data file; and
automatically converting the dynamic language source code from the source format to the target format by accessing the migration data file to identify the location of the incompatible code, the determined solution, and the indicated conversion technique.

2. The computer-implemented method of claim 1, further comprising verifying the converted dynamic language source code in an environment compatible with the target format.

3. The computer-implemented method of claim 1, wherein the analyzing comprises at least monitoring variable values and object data types for the dynamic language source code and the identifying comprises identifying an incompatibility based at least in part on the monitored variable values and object data types.

4. The computer-implemented method of claim 1, wherein identifying an incompatibility in the dynamic language source code comprises:
  identifying an operation to be performed on the object;
  determining a set of data types supported by the operation in the target format; and
  determining that the data type for the object is not included in the set of data types supported by the operation in the target format.

5. The computer-implemented method of claim 1, wherein:
  executing the dynamic language source code in an environment compatible with the source format comprises using an interpreter to execute the dynamic language source code in an environment compatible with the source format; and
  analyzing the run-time information comprises using instrumentation included in the interpreter to access the run-time information.

6. The computer-implemented method of claim 1, wherein the dynamic language source code does not include an incompatibility with respect to the source format, and wherein execution of the dynamic language source code is performed without identifying an incompatibility with respect to the source format.

7. The computer-implemented method of claim 1, wherein:
  executing the dynamic language source code comprises performing one or more unit tests on the dynamic language source code in the environment compatible with the source format, wherein the dynamic language source code does not include a semantic incompatibility with respect to the source format; and
  identifying the incompatibility comprises determining that a statement of code in the dynamic language source code does not include a semantic incompatibility with respect to the source format, and determining that the statement of code includes a semantic incompatibility with respect to the target format.

8. A non-transitory computer-readable medium storing executable computer instructions for migrating dynamic language source code from a source format to a target format, the computer instructions comprising instructions for:
  executing the dynamic language source code in an environment compatible with the source format;
  analyzing, during execution of the dynamic language source code, runtime information associated with the execution of the dynamic language source code in the environment compatible with the source format;
  determining a data type for an object in the dynamic language source code for the target format based on the analyzed runtime information;
  identifying, responsive to the analyzed runtime information and the determined data type, a run-time incompatibility in the dynamic language source code with respect to the target format involving the determined data type for the object being used in a manner that is incompatible with the data type in the target format, the automatically identifying being accomplished by
    accessing encoded expert knowledge describing how to convert dynamic language source code from a source format to a target format; and
    determining that a run-time incompatibility with respect to the target format exists in the dynamic language source code based on the accessed encoded expert knowledge;
  performing a lookup, in a data structure, for a solution to the identified run-time incompatibility, the solution enabling the dynamic language source code to be made compatible with the target format by indicating a conversion technique for converting the object to a data type that is compatible with respect to the target format;
  recording an identified runtime incompatibility, a location of the identified runtime incompatibility in the dynamic language source code, and the determined solution to the identified runtime incompatibility in a migration data file; and
  converting the dynamic language source code from the source format to the target format by accessing the migration data file to identify the location of the incompatible code, the determined solution, and the indicated conversion technique.

9. The computer-readable medium of claim 8, the instructions further comprising instructions for verifying the converted source code in an environment compatible with the target format.

10. The computer-readable medium of claim 8, wherein the analyzing comprises at least monitoring variable values and object data types for the dynamic language source code and the identifying comprises identifying an incompatibility based at least in part on the monitored variable values and object data types.

11. The computer-readable medium of claim 8, wherein identifying an incompatibility in the dynamic language source code comprises:
  identifying an operation to be performed on the object;
  determining a set of data types supported by the operation in the target format; and determining that the data type for the object is not included in the set supported by the operation in the target format.

12. The computer-readable medium of claim 8, wherein:
executing the dynamic language source code in an environment compatible with the source format comprises using an interpreter to execute the dynamic language source code in an environment compatible with the source format; and
analyzing the run-time information comprises using instrumentation included in the interpreter to access the run-time information.

13. A system for migrating dynamic language source code from a source format to a target format, for the system comprising:
a non-transitory computer-readable storage medium storing executable computer program instructions comprising instructions for:
executing the dynamic language source code in an environment compatible with the source format;
analyzing, during execution of the dynamic language source code, runtime information associated with the execution of the dynamic language source code in the environment compatible with the source format;
determining a data type for an object in the dynamic language source code for the target format based on the analyzed runtime information;
identifying, responsive to the analyzed runtime information and the determined data type, a run-time incompatibility in the dynamic language source code with respect to the target format involving the determined data type for the object being used in a manner that is incompatible with the data type in the target format, the automatically identifying being accomplished by
accessing encoded expert knowledge describing how to convert dynamic language source code from a source format to a target format; and
determining that a run-time incompatibility with respect to the target format exists in the dynamic language source code based on the accessed encoded expert knowledge;
performing a lookup, in a data structure, for a solution to the identified run-time incompatibility, the solution enabling the dynamic language source code to be made compatible with the target format by indicating a conversion technique for converting the object to a data type that is compatible with respect to the target format;
recording any identified runtime incompatibility, a location of the identified runtime incompatibility in the dynamic language source code, and the determined solution to the identified runtime incompatibility in a migration data file; and
converting the dynamic language source code from the source format to the target format by accessing the migration data file to identify the location of the incompatible code, the determined solution and the indicated conversion technique; and
a processor for executing the computer program instructions.

14. The system of claim 13, wherein identifying an incompatibility in the dynamic language source code comprises:
identifying an operation to be performed on the object;
determining a set of data types supported by the operation in the target format; and
determining that the data type for the object is not included in the set supported by the operation in the target format.

15. The system of claim 13, wherein:
executing the dynamic language source code in an environment compatible with the source format comprises using an interpreter to execute the dynamic language source code in an environment compatible with the source format; and
analyzing the run-time information comprises using instrumentation included in the interpreter to access the run-time information.

16. The method of claim 1, wherein the source format and the target format are source and target versions of a same programming language, and wherein the source version of the programming language has a semantic incompatibility with the target version of the programming language.

17. The method of claim 1, wherein analyzing runtime information associated with the execution of the dynamic language source code in the environment compatible with the source format comprises:
identifying a behavior of the dynamic language source code occurring during execution of the dynamic language source code; and
checking whether the identified behavior is compatible with the target format.

\* \* \* \* \*